United States Patent
Huang

(10) Patent No.: US 8,498,675 B2
(45) Date of Patent: Jul. 30, 2013

(54) MOBILE COMMUNICATION DEVICE AND INCOMING CALL NOTICING CONTROL METHOD THEREOF

(75) Inventor: Chi-Jen Huang, Taipei (TW)

(73) Assignee: Inventec Appliances Corp., Taipei (TW)

( * ) Notice: Subject to any disclaimer, the term of this patent is extended or adjusted under 35 U.S.C. 154(b) by 682 days.

(21) Appl. No.: 12/649,088

(22) Filed: Dec. 29, 2009

(65) Prior Publication Data

US 2010/0167795 A1 Jul. 1, 2010

(30) Foreign Application Priority Data

Dec. 31, 2008 (TW) .............................. 97151859 A

(51) Int. Cl.
*H04B 1/38* (2006.01)
*H04M 1/00* (2006.01)

(52) U.S. Cl.
USPC ............... 455/567; 455/569.1; 455/575.1; 455/90.3

(58) Field of Classification Search
USPC .............. 455/567, 550.1, 564, 575.1, 90.1
See application file for complete search history.

(56) References Cited

U.S. PATENT DOCUMENTS

| | | | |
|---|---|---|---|
| 6,408,178 B1 * | 6/2002 | Wickstrom et al. ........... | 455/427 |
| 6,463,278 B2 * | 10/2002 | Kraft et al. .................... | 455/418 |
| 6,614,810 B1 * | 9/2003 | Lee et al. ....................... | 370/471 |
| 6,928,306 B2 * | 8/2005 | Matsuda et al. ............... | 455/567 |
| 6,968,216 B1 * | 11/2005 | Chen et al. .................... | 455/567 |
| 7,089,041 B2 * | 8/2006 | Huang ........................... | 455/567 |
| 7,392,006 B2 * | 6/2008 | Kameda et al. ............... | 399/329 |
| 7,394,778 B2 * | 7/2008 | Kim ............................... | 370/312 |
| 7,684,358 B2 * | 3/2010 | Kim et al. ...................... | 370/312 |
| 7,773,506 B2 * | 8/2010 | Agashe et al. ................ | 370/230 |
| 7,864,722 B2 * | 1/2011 | Yi et al. ......................... | 370/312 |
| 8,085,709 B2 * | 12/2011 | Franceschini et al. ........ | 370/328 |
| 8,213,999 B2 * | 7/2012 | Luke et al. .................... | 455/574 |
| 2002/0021278 A1 * | 2/2002 | Hinckley et al. ............. | 345/156 |
| 2002/0025838 A1 * | 2/2002 | Kawamura .................... | 455/567 |
| 2003/0012217 A1 * | 1/2003 | Andersson et al. ........... | 370/437 |
| 2003/0231643 A1 * | 12/2003 | Gilchrist et al. .............. | 370/401 |
| 2004/0127198 A1 * | 7/2004 | Roskind et al. ............. | 455/412.2 |
| 2004/0133817 A1 * | 7/2004 | Choi ............................. | 713/300 |
| 2004/0156330 A1 * | 8/2004 | Yi et al. ........................ | 370/328 |
| 2004/0259536 A1 * | 12/2004 | Keskar et al. ................ | 455/418 |
| 2005/0078653 A1 * | 4/2005 | Agashe et al. ................ | 370/349 |
| 2005/0237960 A1 * | 10/2005 | Kim ............................... | 370/312 |
| 2006/0240866 A1 * | 10/2006 | Eilts ........................... | 455/556.1 |
| 2007/0004451 A1 * | 1/2007 | Anderson ................. | 455/556.1 |
| 2008/0043623 A1 * | 2/2008 | Franceschini et al. ........ | 370/235 |
| 2009/0138736 A1 * | 5/2009 | Chin ............................. | 713/320 |
| 2010/0159998 A1 * | 6/2010 | Luke et al. .................... | 455/567 |

FOREIGN PATENT DOCUMENTS

TW 200828958 A 7/2008

* cited by examiner

*Primary Examiner* — Tilahun B Gesesse
(74) *Attorney, Agent, or Firm* — Rabin & Berdo, P.C.

(57) ABSTRACT

A mobile communication device and an incoming call noticing control method thereof are provided. The incoming call noticing control method is used for controlling a mobile communication device. The mobile communication device includes a main body and a ring unit. The main body has a body surface. The ring unit is used for emitting a ringtone. The incoming call noticing control method includes the follow steps. The vibration frequency and the vibration amplitude of the main body are detected. Whether the body surface is substantially facing a predetermined orientation is detected. The volume of the ringtone is controlled according to whether the body surface is facing the predetermined orientation and according to the vibration frequency and the vibration amplitude.

16 Claims, 4 Drawing Sheets

MOBILE COMMUNICATION DEVICE AND INCOMING CALL NOTICING CONTROL METHOD THEREOF

This application claims the benefit of Taiwan application Serial No. 97151859, filed Dec. 31, 2008, the subject matter of which is incorporated herein by reference.

BACKGROUND OF THE INVENTION

1. Field of the Invention

The invention relates in general to a mobile communication device and an incoming call noticing control method thereof, and more particularly to a mobile communication device capable of automatically controlling the ringtone volume of the incoming call and an incoming call noticing control method thereof.

2. Description of the Related Art

With the rapid advance in technology, mobile electronic devices such as mobile phone, personal digital assistant (PDA) or global positioning system (GPS) have become indispensable tools to many people. As these mobile electronic devices are so popular to such an extent that almost everyone has a communication device, various manufacturers are devoted to provide multi-function mobile electronic devices.

An incoming call of a mobile phone is emitted by many ways such as noticing ringtone, vibration and silence. The noticing ringtone of an incoming call of the mobile phones currently available in the market is set by the user directly. That is, if the user would like to adjust the volume of the ringtone or reset the incoming call to a vibration mode, these adjustment or setting must be done manually, and this is indeed very inconvenient in terms of use.

SUMMARY OF THE INVENTION

The invention is directed to a mobile communication device and an incoming call noticing control method thereof. The mobile communication device automatically senses its movement state and automatically controls the incoming call noticing by, for example, controlling the magnitude of the volume of the ringtone and the intensity of the vibration.

According to a first aspect of the present invention, a mobile communication device is provided. The mobile communication device includes a main body, a sensor, a ring unit and a processor. The main body has a body surface. The sensor is disposed in the main body and used for detecting whether the body surface is substantially facing in a predetermined direction and for detecting a vibration frequency of the main body and a vibration amplitude to which the main body is vibrated. The ring unit is used for emitting a ringtone. The processor is used for directing the ring unit to emit the sound and for adjusting volume of the sound according to whether the body surface is substantially facing in the predetermined direction and according to the vibration frequency and the vibration amplitude, when the mobile communication device receives an incoming call signal.

According to a second aspect of the present invention, an incoming call noticing control method for a mobile communication device is provided. The mobile communication device includes a main body and a ring unit. The main body has a body surface, and the ring unit is used for emitting a ringtone. The incoming call noticing control method includes the follow steps. The vibration frequency and the vibration amplitude of the main body are detected. Whether the body surface is substantially facing a predetermined direction is detected. The volume of the ringtone is controlled according to whether the body surface is facing the predetermined direction and according to the vibration frequency and the vibration amplitude.

The invention will become apparent from the following detailed description of the preferred but non-limiting embodiments. The following description is made with reference to the accompanying drawings.

DETAILED DESCRIPTION OF THE INVENTION

According to the invention, a sensor is disposed in the mobile communication device to sense the movement state of the mobile communication device. The mobile communication device further automatically controls the way of emitting the incoming call accordingly.

A preferred embodiment is disclosed for elaborating the invention. However, the disclosure and the accompanying drawings of the embodiment are for exemplification purpose only, not for limiting the scope of protection of the invention. Moreover, secondary elements are omitted to highlight the technical features of the invention.

Figure 1:
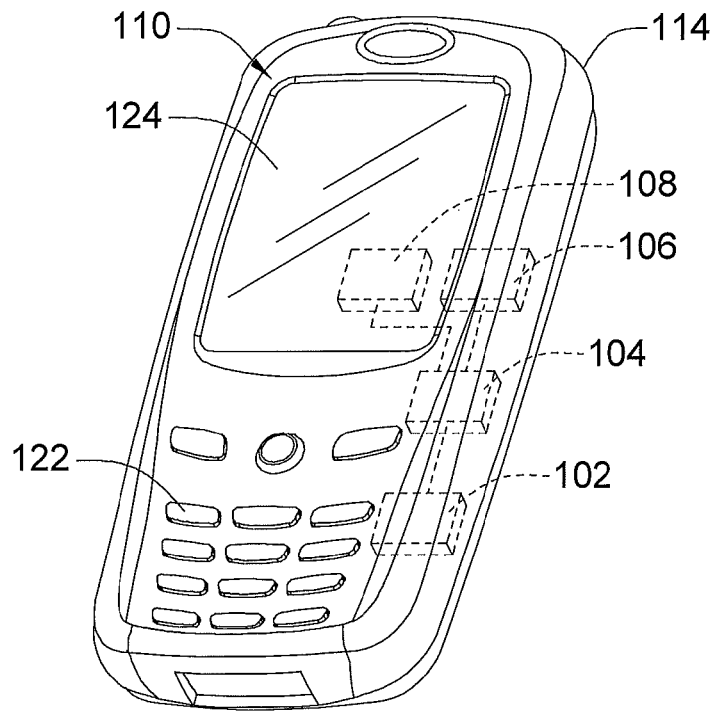
FIG. 1 shows a mobile communication device according to a preferred embodiment of the invention.
Figure 2:
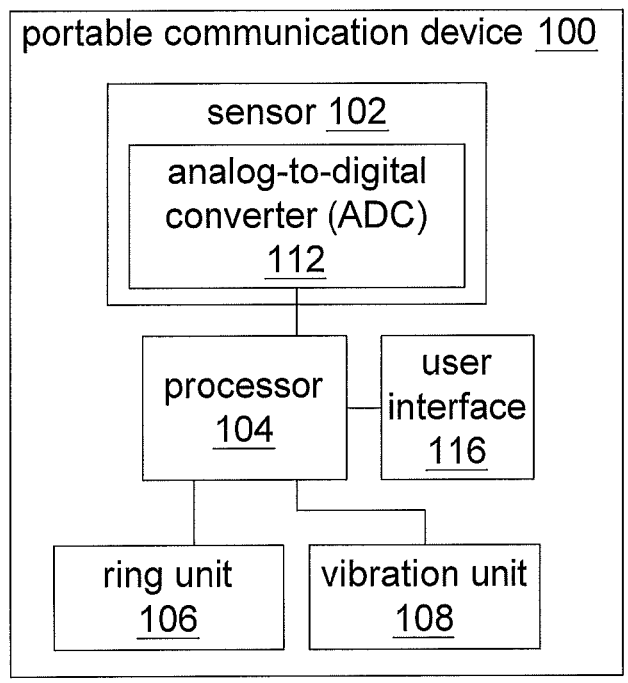
FIG. 2 shows a function block diagram of a mobile communication device of FIG. 1.

Refer to FIG. 1 and FIG. 2. FIG. 1 shows a mobile communication device according to a preferred embodiment of the invention. FIG. 2 shows a function block diagram of a mobile communication device of FIG. 1. As indicated in FIG. 1, the mobile communication device 100 includes a main body 114, a sensor 102, a processor 104, a ring unit 106 and a vibration unit 108. The main body 114 has a body surface 110. The sensor 102 is disposed in the main body 114 and can be an acceleration sensor.

In addition, the mobile communication device 100 further includes an operation unit, such as an input key 122 and a display unit 124, disposed on the body surface 110. That is, the input key 122 or the display unit 124 is disposed on the body surface 110.

The ring unit 106, such as a speaker, is used for emitting a ringtone (not illustrated). The vibration unit 108 is used for vibrating the main body 114. When the mobile communication device 100 receives an incoming call signal (not illustrated), the processor 104, such as processor of an in-built coding/decoding unit (CODEC), transmits an electronic signal (not illustrated) to the ring unit 106 and the vibration unit 108 for directing the ring unit 106 to emit the ringtone and for directing the vibration unit 108 to vibrate the main body 114 to a degree of vibration according to whether the body surface 110 is facing in the predetermined direction and according to the vibration frequency and the vibration amplitude.

As indicated in FIG. 2, the mobile communication device 100 further includes a user interface 116 used for providing at least one incoming call noticing mode. A predetermined volume of the ringtone and a predetermined degree of vibration of the main body can be set in the incoming call noticing mode and stored in a memory unit (not illustrated) of the mobile communication device 100. Besides, the sensor 102 has an in-built analog-to-digital converter (ADC) 112 for converting the acceleration value detected by the sensor 102 to a digital signal, and transmitting the digital signal to the processor 104. The sensor 102 disposed in the main body 114 is used for detecting whether the body surface 110 is substantially facing in a predetermined direction and detecting the vibration frequency and the vibration amplitude of the main body 114. The processor 104 controls the volume of the ringtone and the degree of the vibration according to whether the body surface 110 is substantially facing in the predetermined direction, and according to the vibration frequency and the vibration amplitude.

Figure 3:
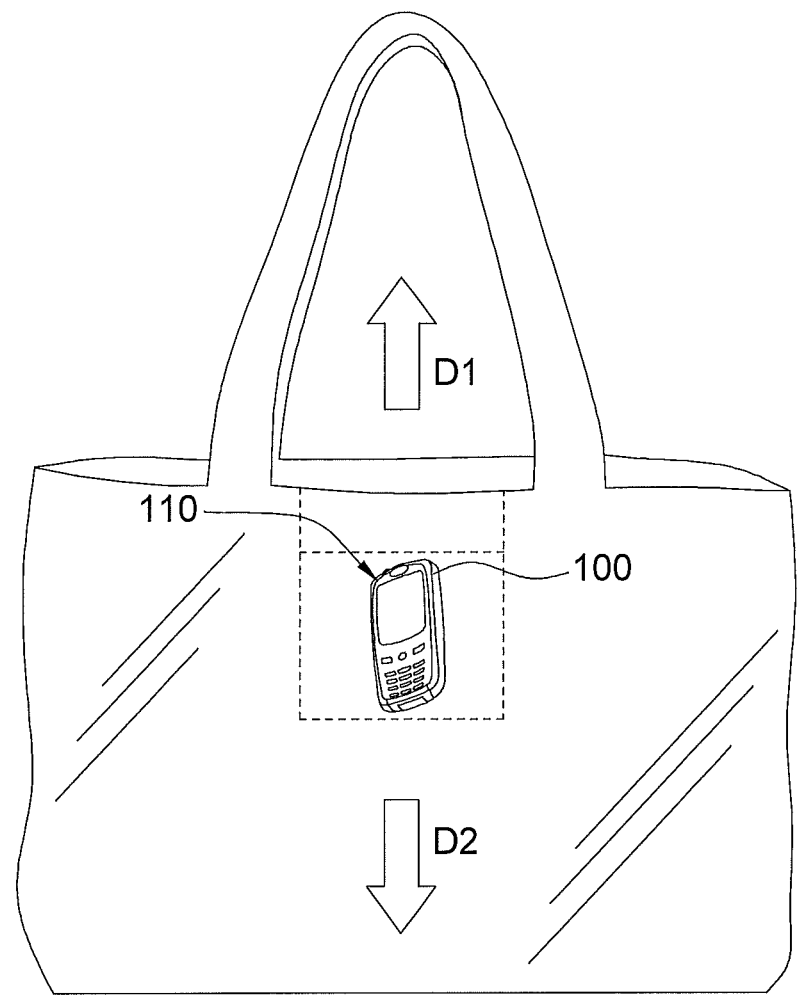
FIG. 3 shows a mobile communication device of FIG. 1 being placed at a natural posture.

Referring to FIG. 3, a mobile communication device of FIG. 1 being placed in a posture is shown. When a carrier of the mobile communication device 100 walks with the mobile communication device 100 in his or her pocket, the mobile communication device 100 can be in any posture. For example, the mobile communication device 100 may tilt to an angle or stand upright. In general, the body surface 110 is not facing the predetermined direction such as the ground direction D2 or the sky direction D1. As the device carrier is walking, the vibration frequency and the vibration amplitude are not equal to 0. For example, the vibration frequency is greater than a first predetermined vibration frequency and the vibration amplitude is greater than a first predetermined vibration amplitude. Thus, the processor 104 accordingly determines that the device carrier is walking, and sets the volume of the ringtone at first predetermined volume and sets the degree of the vibration at a first predetermined degree of vibration. The first predetermined volume and the first predetermined degree of vibration are the volume and the degree of vibration that can be sensed when the device carrier is walking.

Moreover, the user interface 116 provides a first incoming call noticing mode. The first predetermined volume and the first predetermined degree of vibration are set in the first incoming call noticing mode. That is, the device carrier can set the first predetermined volume and the first predetermined degree of vibration through the user interface 116. For example, the user interface 116 provides several volume options, such as low volume, medium volume and high volume, and several degrees of vibration options, such as slight vibration, medium vibration and great vibration. The device carrier can set the first predetermined volume at the low volume or the medium volume, and set the first predetermined degree of vibration in the slight vibration or the medium vibration.

Furthermore, when the sensor 102 detects that the body surface 110 of the mobile communication device 100 is not facing the ground direction D2 or the sky direction D1, the vibration frequency is greater than a second predetermined vibration frequency and the vibration amplitude is greater than a second predetermined vibration amplitude, the processor 104 sets the volume of the ringtone at second predetermined volume and sets the degree of the vibration at a second predetermined degree of vibration. For example, when the device carrier is jogging with placing the mobile communication device 100 at his or her pocket, the vibration frequency and the vibration amplitude of the mobile communication device 100 are both higher than the vibration frequency and the vibration amplitude when the carrier is in the walking state. Under such circumstances, the second predetermined vibration frequency is set to be greater than the first predetermined vibration frequency and the second predetermined vibration amplitude is set to be greater than the first predetermined vibration amplitude, so that the processor 104 can determine whether the device carrier is jogging or walking. As the device carrier is jogging, a more apparent incoming call noticing is required for the device carrier to sense the incoming call noticing. Thus, the second predetermined volume is preferably greater than the first predetermined volume, and the second predetermined degree of the vibration is preferably greater than the first predetermined degree of the vibration. The second predetermined volume and the second predetermined degree of the vibration are the volume and the degree of the vibration that can be sensed when the device carrier is jogging.

Thus, even the device carrier is in a movement state, the mobile communication device 100 still can automatically control the ringtone volume magnitude and the degrees of the vibration of the incoming call noticing at a volume and a degree of the vibration that can be sensed by the device carrier, so that the device carrier will not miss any incoming call. That is, even if the device carrier forgets to set the incoming call noticing mode at an appropriate mode, the mobile communication device 100 still can automatically set the incoming call noticing mode at the appropriate state according to the posture of the mobile communication device 100 and the movement state of the user.

In addition, the user interface 116 further provides a second incoming call noticing mode. The second predetermined volume and the second predetermined degree of vibration are set in the second incoming call noticing mode. That is, the device carrier can set the second predetermined volume and the second predetermined degree of vibration through the user interface 116. For example, the device carrier can set the second predetermined volume at the high volume and set the second predetermined degree of vibration in the great vibration.

Figure 4:
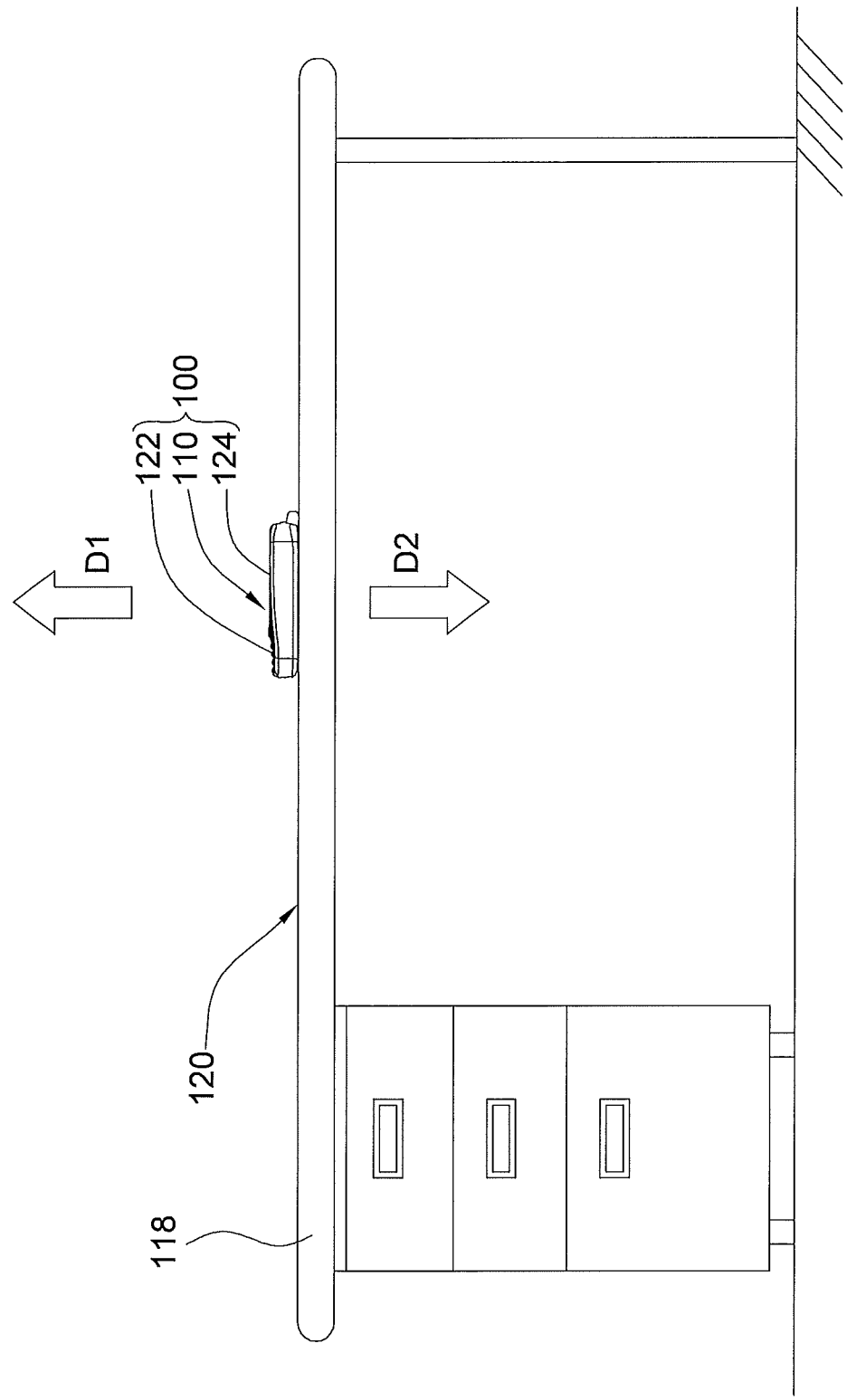
FIG. 4 shows a mobile communication device of FIG. 1 being placed on a desktop.

Referring to FIG. 4, a mobile communication device of FIG. 1 being placed on a desktop is shown. When the body surface 110 is substantially facing the sky direction D1 and the vibration frequency and the vibration amplitude are equal to 0, this implies that the main body 114 is not shaken. For example, when the device carrier places the mobile communication device 100 on a desktop 120 of a conference table 118 during a meeting at a conference room, the processor 104 directs the volume of the ringtone at third predetermined volume and sets the degree of the vibration in a third predetermined degree of vibration, wherein the third predetermined volume is equal to 0 but the third predetermined degree of vibration is not equal to 0. Hereinafter, the incoming call noticing mode of the mobile communication device 100 is originally set at the first incoming call noticing mode or the second incoming call noticing mode for illustrating. When the mobile communication device 100 automatically detects that the body surface 110 is substantially facing the ground direction D2 or the sky direction D1 and the both vibration frequency and the vibration amplitude are equal to 0, the mobile communication device 100 determines that the device carrier is in a meeting and automatically adjusts the ringtone volume at silence but still reserves the vibration mode when receiving the incoming call. Thus, the device carrier does not need to manually set the mode of the mobile communication device 100 during meeting because the mobile communication device 100 of the present embodiment of the invention is automatically set at the vibration mode. Particularly, despite the device carrier forgets to set the mobile communication device 100 at the vibration mode during a meeting, the mobile communication device 100 is still automatically set at the vibration mode. Thus, the mobile communication device 100 of the present embodiment of the invention is indeed very user-friendly.

The user interface 116 further provides a third incoming call noticing mode. The third predetermined volume and the third predetermined degree of vibration are set in the third incoming call noticing mode. That is, the device carrier can set the predetermined volume and the predetermined degree of vibration through the user interface 116. For example, the device carrier can set the third predetermined volume at 0, that is, silence, and set the third predetermined degree of vibration in the slight vibration, medium vibration or great vibration.

In the exemplification of the present embodiment of the invention, the third predetermined volume is set at 0 but the third predetermined degree of vibration is not equal to 0. However, in other embodiments, the third predetermined volume and the third predetermined degree of vibration can be set freely through the user interface 116. For example, the third predetermined volume is set 0 and the third predetermined degree of vibration can also be set at 0, that is, no vibration.

Besides, the processor 104 sets the volume of the ringtone at fourth predetermined volume and sets the degree of the vibration in a fourth predetermined degree of vibration when the body surface 110 is not facing in the predetermined direction but the vibration frequency is equal to 0 and the vibration amplitude is equal to 0, that is, the main body 114 is not shaken. The above circumstances imply that the carrier is in a still state with the mobile communication device 100 placing in the carrier's pocket, for example, when the carrier is waiting for a bus or sitting on a chair. The fourth predetermined volume is equal to 0, but the fourth predetermined degree of vibration is not equal to 0. Thus, even the mobile communication device 100 is placed in the pocket and the external environment is very noisy, the device carrier still can sense that the mobile communication device 100 receives an incoming call through the vibration of the mobile communication device 100.

The user interface 116 further provides a fourth incoming call noticing mode. The fourth predetermined volume and the fourth predetermined degree of vibration are set in the fourth incoming call noticing mode. That is, the device carrier can set the fourth predetermined volume and the fourth predetermined degree of vibration through the user interface 116. For example, the device carrier can set the fourth predetermined volume at silence, and set the fourth predetermined degree of vibration in slight vibration, medium vibration or the great vibration.

In the exemplification of the present embodiment of the invention, the fourth predetermined volume is equal to 0 but the fourth predetermined degree of vibration is not equal to 0. However, in other embodiments, the fourth predetermined volume and the fourth predetermined degree of vibration can be set freely through the user interface 116 and are not subjected to the exemplification of the present embodiment of the invention.

Moreover, the user interface 116 further provides a setting mode (not illustrated). The processor 104 is disabled or enabled from directing the volume of the ringtone and the performance of the vibration according to the setting mode. Furthermore, if the user is at home (that is, the user is not in a meeting) and places the mobile communication device 100 on a desk, the user can set the setting mode to disable the processor 104 from automatically controlling the incoming call noticing. Therefore, avoiding the mobile communication device 100 being automatically set at a vibration mode which makes the user not hear the sound of an incoming call is achieved. That is, if the user disables the function of the mobile communication device 100 with respect to the automatic control of an incoming call noticing, then the processor 104 no more controls the ring volume magnitude and the vibration performance according to the orientation of the body surface 110, the vibration frequency or the vibration amplitude, but rather, the processor 104 controls the ring unit 106 and the vibration unit 108 to react according to the current predetermined volume and the current predetermined degree of vibration.

Figure 5:
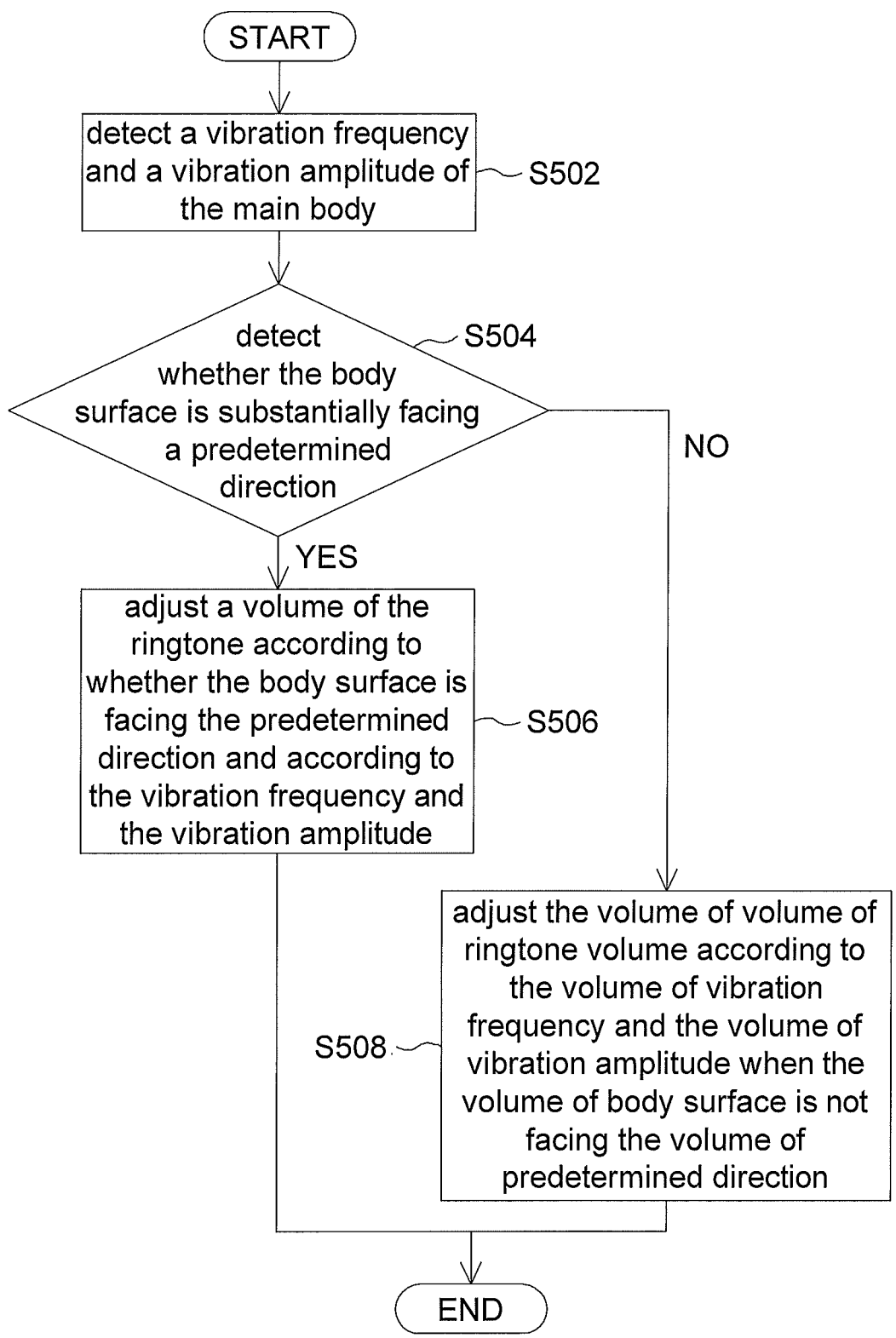
FIG. 5 shows an incoming call noticing control method for a mobile communication device according to a preferred embodiment of the invention.

Referring to FIG. 5, an incoming call noticing control method for a mobile communication device according to a preferred embodiment of the invention is shown. The incoming call noticing control method includes the follow steps. Firstly, in the method begins at step S502, the sensor 102 detects the vibration frequency and the vibration amplitude of the main body 114.

Next, the method proceeds to step S504, the sensor 102 detects whether the body surface 110 is substantially facing in a predetermined direction, such as a ground direction or a sky direction. If yes, then the method proceeds to step S506, otherwise, the method proceeds to step S508.

Then, the method proceeds to step S506, the processor 104 adjusts the volume of the ringtone according whether the body surface 110 is facing in a predetermined direction, and according to the vibration frequency and the vibration amplitude.

For example, when the body surface 110 is substantially facing in the predetermined direction and both the vibration frequency and the vibration amplitude are equal to 0, the processor 104 sets the volume of the ringtone at a third predetermined volume and sets the degree of vibration at a third predetermined degree of vibration.

Or, the method proceeds to step S508, the processor 104 adjusts the ringtone volume according to whether the body surface 110 is not facing in predetermined direction, and according to the vibration frequency and the vibration amplitude.

For example, when the body surface 110 is not facing the ground direction D2 or the sky direction D1 but the vibration frequency is greater than a first predetermined vibration frequency and the vibration amplitude is greater than a first predetermined vibration amplitude, the processor 104 sets the volume at the first predetermined volume and sets the degree of vibration at the first predetermined degree of vibration.

In another example, when the body surface 110 is not facing in predetermined direction, but the vibration frequency is greater than a second predetermined vibration frequency and the vibration amplitude is greater than a second predetermined vibration amplitude, the processor 104 sets the volume at the second predetermined volume and sets the degree of vibration performance in the second predetermined degree of vibration.

In yet another example, when the body surface 110 is not facing in predetermined direction but both the vibration frequency and the vibration amplitude are equal to 0, the processor 104 sets the volume at the fourth predetermined volume and sets the degree of vibration in the fourth predetermined degree of vibration.

Also, a user interface 116 can be used for setting the first incoming call noticing mode, the second incoming call noticing mode, the third incoming call noticing mode and the fourth incoming call noticing mode. For example, the incoming call noticing control method of the present embodiment of the invention further includes the follow steps: The first predetermined volume and the first predetermined degree of vibration are set at the first incoming call noticing mode.

For example, the second predetermined volume and the second predetermined degree of vibration are set at the second incoming call noticing mode.

For example, the third predetermined volume and the third predetermined degree of vibration are set at the third incoming call noticing mode.

For example, the fourth predetermined volume and the fourth predetermined degree of vibration are set at the fourth incoming call noticing mode.

Besides, the user can further use the setting mode provided by the user interface 116 to disable or enable the processor 104 from controlling the volume and the vibration performance. Furthermore, the above setting can be done at any time, and is not restricted by the sequence of the above steps S502-S508.

According to the mobile communication device and the incoming call noticing control method thereof disclosed in the above embodiment of the invention, the sensor detects the vibration frequency and the vibration amplitude of the mobile communication device and detects whether the body surface is facing in a predetermined direction, so as to determine the device carrier's movement state such as walking, jogging and stillness. Then, the processor automatically adjusts the volume of ringtone emitted from the ring unit and the vibration performance generated from the vibration unit according to the movement state being determined. Thus, no matter whatever state the device carrier is in, for example, the device carrier changes to a meeting state from a walking state, the mobile communication device automatically adjusts the ringtone and the vibration of the incoming call noticing without bothering the device carrier to manually set the incoming call noticing mode when the mobile communication device changes to be in the meeting state.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile communication device comprising: a main body having a body surface; a vibration unit for vibrating the main body; a sensor disposed in the main body for detecting whether the body surface is substantially facing in a predetermined direction and for detecting a vibration frequency of the main body and a vibration amplitude to which the main body is vibrated; a ring unit for emitting a ringtone; a processor for directing the ring unit to emit the ringtone and for adjusting volume of the ringtone according to whether the body surface is substantially facing in the predetermined direction and according to the vibration frequency and the vibration amplitude, when the mobile communication device receives an incoming call signal; wherein, the processor is further for directing the vibration unit to vibrate the main body to a degree of vibration according to whether the body surface is facing in the predetermined direction and according to the vibration frequency and the vibration amplitude, when the mobile communication device receives the incoming call signal.

2. The mobile communication device according to claim 1, further comprising:
a user interface for providing an incoming call noticing mode, wherein a predetermined value of volume of the ringtone and a predetermined degree of vibration of the main body are set in the incoming call noticing mode.

3. The mobile communication device according to claim 1, further comprising:
a user interface for providing a setting mode in which to set the processor's function of adjusting volume of the ringtone and the degree of vibration enabled or disabled.

4. The mobile communication device according to claim 1, wherein if the body surface is not facing in the predetermined direction, the vibration frequency is greater than a first predetermined vibration frequency, and the vibration amplitude is greater than a first predetermined vibration amplitude, the processor sets volume of the ringtone at first predetermined volume and sets the degree of vibration at a first predetermined degree of vibration;
wherein, the first predetermined volume and the first predetermined degree of vibration are not equal to 0.

5. The mobile communication device according to claim 4, wherein if the body surface is not facing in the predetermined direction, the vibration frequency is greater than a second predetermined vibration frequency, and the vibration amplitude is greater than a second predetermined vibration amplitude, the processor sets volume of the ringtone at second predetermined volume and sets the degree of vibration at a second predetermined degree of vibration;
wherein, the second predetermined vibration frequency is greater than the first predetermined vibration frequency, the second predetermined vibration amplitude is greater than the first predetermined vibration amplitude, the second predetermined volume is greater than the first predetermined volume, and the second predetermined degree of vibration is greater than the first predetermined degree of vibration.

6. The mobile communication device according to claim 1, wherein if the body surface is facing in the predetermined direction, the vibration frequency is equal to 0, and the vibration amplitude is equal to 0, the processor sets volume of the ringtone at third predetermined volume and sets the degree of vibration at a third predetermined degree of vibration;
wherein, the third predetermined volume is substantially equal to 0.

7. The mobile communication device according to claim 1, wherein if the body surface is not facing in the predetermined direction, the vibration frequency is equal to 0 and the vibration amplitude is equal to 0, the processor sets volume of the ringtone at fourth predetermined volume and sets the degree of vibration at a fourth predetermined degree of vibration;
wherein, the fourth predetermined volume is equal to 0 but the fourth predetermined degree of vibration is not equal to 0.

8. The mobile communication device according to claim 1, wherein the predetermined direction leads to the ground or the sky.

9. An incoming call noticing control method for a mobile communication device, wherein the mobile communication device comprises a main body having a body surface and a ring unit for emitting a ringtone, and the incoming call noticing control method comprises:
vibrating the main body;
detecting a vibration frequency of the main body and a vibration amplitude to which the main body is vibrated;
detecting whether the body surface is substantially facing in a predetermined direction; and
adjusting volume of the ringtone by adjusting a degree of vibration of the main body according to whether the body surface is facing in the predetermined direction and according to the vibration frequency and the vibration amplitude, when the mobile communication device receives an incoming call signal.

10. The incoming call noticing control method according to claim 9, wherein the mobile communication device further comprises a vibration unit for vibrating the main body to said degree of vibration, and the step of adjusting volume of the ringtone comprises: setting the volume of the ringtone at first predetermined volume and setting the degree of vibration at a first predetermined degree of vibration if the body surface is not facing in the predetermined direction, the vibration frequency is greater than a first predetermined vibration frequency and the vibration amplitude is greater than a first predetermined vibration amplitude; wherein the first predetermined volume and the first predetermined degree of vibration are not equal to 0.

11. The incoming call noticing control method according to claim 10, wherein the mobile communication device further comprises a user interface for providing an incoming call noticing mode, and before the step of adjusting volume of the ringtone, the incoming call noticing control method further comprises:
setting a predetermined value of volume of the ringtone and a predetermined degree of vibration in the incoming call noticing mode.

12. The incoming call noticing control method according to claim 10, wherein the mobile communication device further comprises a user interface for providing a setting mode, and the incoming call noticing control method further comprises:
setting the function of adjusting volume of the ringtone and the degree of vibration enabled or disabled in the setting mode.

13. The incoming call noticing control method according to claim 10, wherein the step of adjusting volume of the ringtone comprises:
setting volume of the ringtone at second predetermined volume and setting the degree of vibration at a second predetermined degree of vibration if the body surface is not facing in the predetermined direction, the vibration frequency is greater than a second predetermined vibration frequency and the vibration amplitude is greater than a second predetermined vibration amplitude;
wherein, the second predetermined vibration frequency is greater than the first predetermined vibration frequency, the second predetermined vibration amplitude is greater than the first predetermined vibration amplitude, the second predetermined volume is greater than the first predetermined volume, and the second predetermined degree of vibration is greater than the first predetermined degree of vibration.

14. The incoming call noticing control method according to claim 9, wherein the mobile communication device further comprises a vibration unit for vibrating the main body to said degree of vibration, and the step of adjusting volume of the ringtone comprises:
setting volume of the ringtone at a third predetermined volume and setting the degree of vibration at a third predetermined degree of vibration if the body surface is facing in the predetermined direction and both the vibration frequency and the vibration amplitude are equal to 0; wherein the third predetermined volume is equal to 0.

15. The incoming call noticing control method according to claim 9, wherein the mobile communication device further comprises a vibration unit for vibrating the main body to said degree, and the step of adjusting volume of the ringtone comprises: setting volume of the ringtone at a fourth predetermined volume and setting the degree of vibration at a fourth predetermined degree of vibration if the body surface is not facing in the predetermined direction and both the vibration frequency and the vibration amplitude are equal to 0; wherein the fourth predetermined volume is equal to 0 but the fourth predetermined degree of vibration is not equal to 0.

16. The incoming call noticing control method according to claim 9, wherein the predetermined direction leads to the ground or the sky.

* * * * *